(12) United States Patent
Maurer

(10) Patent No.: US 7,118,723 B2
(45) Date of Patent: Oct. 10, 2006

(54) METHOD FOR PRODUCING NITRIC ACID

(75) Inventor: Rainer Maurer, Schwelm (DE)

(73) Assignee: UHDE GmbH, Dortmund (DE)

( * ) Notice: Subject to any disclaimer, the term of this patent is extended or adjusted under 35 U.S.C. 154(b) by 230 days.

(21) Appl. No.: 10/220,361

(22) PCT Filed: Mar. 2, 2001

(86) PCT No.: PCT/EP01/02365

§ 371 (c)(1),
(2), (4) Date: Nov. 20, 2002

(87) PCT Pub. No.: WO01/68520

PCT Pub. Date: Sep. 20, 2001

(65) Prior Publication Data

US 2003/0143148 A1    Jul. 31, 2003

(30) Foreign Application Priority Data

Mar. 10, 2000   (DE) ............................... 100 11 335

(51) Int. Cl.
*C01B 21/38* (2006.01)
*C01B 21/40* (2006.01)

(52) U.S. Cl. ...................... 423/392; 423/393; 423/394; 423/403

(58) Field of Classification Search ................ 423/392, 423/393, 394, 403
See application file for complete search history.

(56) References Cited

U.S. PATENT DOCUMENTS 4,367,204 A * 1/1983 Klopp et al. ............. 423/239.2
4,711,771 A * 12/1987 Schiller ...................... 423/359
6,264,910 B1 * 7/2001 Maurer et al. ............. 423/392

OTHER PUBLICATIONS

Dr. Robert Powell, "Nitric Acid Technology—Recent Developments", Chemical Process Review No. 30, Noyes Development Corporation (1969), pp. 148-160, (no month).*

* cited by examiner

*Primary Examiner*—Wayne A. Langel
(74) *Attorney, Agent, or Firm*—Marshall & Melhorn, LLC

(57) ABSTRACT

A process for producing nitric acid of a concentration in the range of 68 to 76% by weight, using the mono-pressure or the dual-pressure process in which the ammonia feedstock is combusted with the aid of compressed process air. The water vapour content of the process air used for combustion and/or stripping and imported from outside the system, is reduced in this process.

4 Claims, 2 Drawing Sheets

METHOD FOR PRODUCING NITRIC ACID

BACKGROUND OF THE INVENTION

The present invention relates to a process for the production of nitric acid. The described process for the production of nitric acid is especially based on the mono-pressure or the dual-pressure process in which the ammonia feedstock is combusted with the aid of compressed process air and the nitrous gas formed during combustion is at least partly absorbed by water, thus forming nitric acid, and the non-absorbed tail gas is expanded from the second pressure to ambient pressure in a tail gas expansion turbine for generating compression energy.

The first step in the production of nitric acid is the reaction of ammonia $NH_3$ with air yielding nitrogen oxide NO:

$$4NH_3 + 5O_2 \rightarrow 4NO + 6H_2O + 907.3 \text{ kJ.}$$

The nitrogen oxide NO thus obtained is then oxidised to form nitrogen dioxide $NO_2$:

$$2NO + O_2 \rightarrow 2NO_2 + 113.1 \text{ kJ.}$$

Finally, the nitrogen dioxide $NO_2$ thus obtained is absorbed in water yielding nitric acid:

$$4NO_2 + O_2 + 2H_2O \rightarrow 4 \, HNO_3 + 256.9./.390.3 \text{ kJ.}$$

In order to ensure that the water absorbs the maximum possible portion of the nitrogen dioxide $NO_2$, the absorption is carried out at elevated pressure. The absorption pressure preferably ranges between 4 and 14 bar.

The oxygen required for the reaction of the ammonia feedstock is supplied in the form of atmospheric oxygen. The process air is compressed to a pressure which suits both the oxidation reaction and the absorption reaction.

The energy required for compressing the air is generated, on the one hand, by expanding the tail gas leaving the absorption unit to ambient pressure and, on the other hand, by utilising the heat dissipated in the reactions.

The designs of the different types of nitric-acid production plants are based on the specific requirements of the individual location.

Single-line nitric-acid plants are usually designed and rated for capacities between 100 and 1000 tonnes of nitric acid per day. If the size of the reaction unit is doubled, a single line can yield a daily production of up to 2000 tonnes.

Should a low daily production be required or should the energy prices prevailing at the location be comparatively low, the nitric-acid production plant will be designed on the basis of the high-pressure mono-pressure process. In this process, the pressure applied in the ammonia combustion and nitrogen oxide absorption units will be about equal, i.e. approx. 10 bar.

Should large rated capacities and/or higher acid concentrations be required, it will be more economical to base the design of the nitric-acid production plant on the dual-pressure process.

In the dual-pressure process, the ammonia is combusted at a first pressure which is lower than the absorption pressure. The nitrous gases formed during the combustion are cooled and then compressed to the level of the second pressure, i.e. the absorption pressure.

The formerly constructed plants using normal-pressure combustion and medium-pressure absorption have nowadays been replaced by plants using the more cost-effective mono-pressure or dual-pressure process. The nitric acid obtained is also referred to as sub-azeotropic nitric acid because, if such acid is distilled in a downstream distillation unit, the maximum nitric acid concentration that can be achieved will be 68% due to the formation of an azeotrope. The relevant literature describes a great variety of processes conceived to overcome this limit.

The end users of nitric acid, however, frequently wish to have a nitric acid of a concentration which is only slightly above such 68%, for instance when using nitric acid in the production of adipic acid, caprolactam, toluene diisocyanate or other substances that are nitrated with nitric acid. It is hence a long-standing need of industry to have available a cost-effective process for the production of nitric acid of a concentration between 68 and 76%.

The aim of the present invention, therefore, is to improve the conventional mono-pressure and dual-pressure processes for the production of sub-azeotropic nitric acid by simple and cost-effective means in order to permit the production of that nitric acid at a concentration of up to 76%.

SUMMARY OF THE INVENTION

According to the present invention, this aim can be achieved by reducing the water vapour content of the process air imported from outside the system so that the air is dried. The present invention is based on the idea of minimising the quantity of water entering the system. The moisture entrained by the air enters the $HNO_3$ degassing column as combustion air and stripping air and has a considerable share in the entry of water. The effect of drying the air is that less moisture enters the overall process.

According to another embodiment of the present invention, the process air which is supplied to the combustion unit is dried.

According to another embodiment of the present invention, the stripping air, also referred to as secondary air and used for stripping the produced nitric acid to remove the dissolved $NO_2$ and NO, undergoes drying.

According to another embodiment of the present invention, the stripping air, also referred to as secondary air and used for stripping the produced nitric acid to remove the dissolved $NO_2$ and NO, is dried again by scrubbing it with highly concentrated nitric acid.

All before-mentioned embodiments are based on the same inventive idea: by taking into consideration the economic criteria applicable in the particular case, the engineer who is involved in the design or revamp of a plant has to decide the intensity of drying the air in order to achieve the desired effect and which of the air streams should be dried for this purpose. Technical criteria to be considered in this connection are the air water-vapour load to be expected in the place where the process is run, the efficiency of the process-specific combustion of $NH_3$ with air to form $NO_x$—planned or already in operation—and the desired concentration of the nitric acid to be produced. Approx. 80% of the process air is normally used for combustion and approx. 20% for stripping, which allows an economically optimised individual drying of the different process air streams.

According to another embodiment of the present invention, cooling water of a temperature between 1° C. and 20° C. is provided for drying.

According to another embodiment of the present invention, a coolant of −25° C. to 5° C. is provided for drying.

It is expedient to install the drier for drying the process air streams downstream of the air compressor, but this is not necessarily required to achieve the aim of the present invention.

BRIEF DESCRIPTION OF THE DRAWINGS

Details of the invention are illustrated by the two typical arrangements shown in the accompanying drawings, each of which is represented in one figure.

DESCRIPTION OF THE PREFERRED EMBODIMENTS

Figure 1:
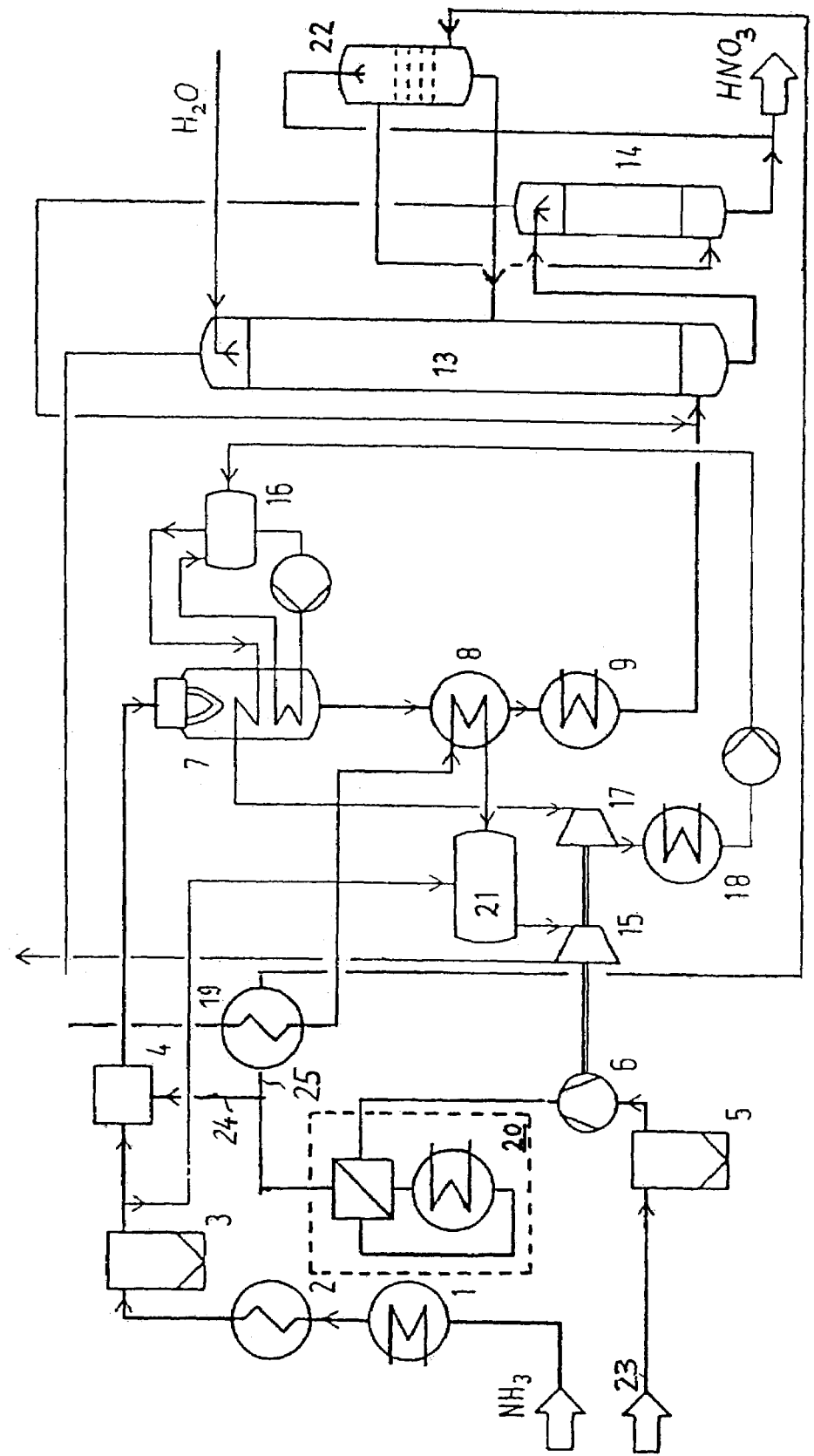
FIG. 1 depicts a mono-pressure process.

FIG. 1 depicts a mono-pressure process with $NH_3$ evaporator 1, $NH_3$ gas pre-heater 2, $NH_3$ gas filter 3, $NH_3$/air mixer 4, air filter 5, air compressor 6, invention-specific air drier 20, $NH_3$ burner 7 with LaMont waste heat boiler, tail gas heater 8, gas cooler 9, absorption tower 13, $HNO_3$ degassing column 14, secondary air drier 22, tail-gas pre-heater 19, $NO_x$ reactor 21, tail-gas expansion turbine 15, steam drum 16, steam condensation turbine 17, and condenser 18.

Liquid ammonia is supplied at approx. 16 bar abs. and approx. 25° C. and fed to $NH_3$ evaporator 1. The evaporation in the latter takes place at about 14 bar abs. which corresponds to an evaporation temperature of 36° C. In $NH_3$ evaporator 1, which is fed with low-pressure steam, the liquid ammonia evaporates almost completely at variable temperatures. The evaporation temperature increases in relation to the rising water content in the evaporator. The pressure in the evaporation system can be adjusted by varying the respective levels and the amount and/or pressure of the low-pressure steam.

The evaporated ammonia passes through a demister before it is fed to steam-heated $NH_3$ gas pre-heater 2 in which it is heated to 140° C. and then to $NH_3$ gas filter 3 to remove all solid particles entrained, if any.

The compressor of the turbo set—consisting of air compressor 6, tail-gas expansion turbine 15 and steam condensation turbine 17—takes in through air filter 5 the moist atmospheric air, which is laden with water vapour 23 and required for the process, and compresses it to 12 bar abs. at a temperature of approx. 250° C.

According to the present invention, this air stream is dried, thus withdrawing as much moisture in this example as required to attain a nitric acid concentration of 76%. The air drier 20 used in this example is provided with an integrated air/air heat exchanger which pre-cools the air entering air drier 20 to approx. 20 to 40° C. Subsequently the pre-cooled air is cooled to approx. 1° C. by chilled water in an indirectly acting cooler integrated into air drier 20; the moisture entrained in the air precipitating on the cooler surfaces as a result of the air temperature that falls below the dew point so that the moisture is separated from the air. When the air leaves the cooler, the water load of the air is lower than that at the time when entering the system, i.e. the air has now been dried.

The dried air is fed to the heat-absorbing side of the air/air heat exchanger integrated into air drier 20 where the dried air is reheated to 220° C.

The dried and heated air stream that leaves air drier 20 is divided into two process-air streams (primary and secondary air) 24 and 25.

Process air 24 (primary air) and ammonia gas are supplied to $NH_3$/air mixer 4. The ammonia content in the gas mixture is kept constant at about 10.1% by vol. using a ratio controller. In downstream $NH_3$ burner 7 the ammonia oxidises in the presence of a Pt—Rh catalyst at a temperature of 900° C. to form nitrogen oxide. The hot combustion gas flows through the LaMont waste heat boiler which forms a constructional unit with $NH_3$ burner 7 and through the tail gas heater 8 so that the reaction heat generated during oxidation to form NO and $NO_2$ is almost completely utilised for steam generation and as input energy (tail-gas expansion turbine 15).

Gas cooler 9 serves to cool the nitrogen oxide to approx. 50° C. by means of circulated cooling water, which results in the condensation of the major part of the reaction water from the combustion and in the formation of nitric acid with a concentration of approx. 44 to 50% by wt.

An acid condensate pump (not shown in FIG. 1) sends the acid to a sieve tray in absorption tower 13, said tray having a similar acid concentration.

Process air 25 (secondary air) is cooled to approx. 60° C. to 80° C., the heat being transferred to the tail gas from absorption tower 13. In $HNO_3$ degassing column 14, which is also referred to as bleaching column, process air 25 is used for degassing the crude acid, the air becoming laden with nitrous gas and then being admixed to the main gas stream upstream of the absorption unit. Prior to fulfilling this function in $HNO_3$ degassing column 14, said air is scrubbed with product-grade nitric acid and thus undergoes a secondary drying in invention-specific secondary air drier 22 which in this example is a $HNO_3$ scrubber.

The remaining NO gas enters absorption tower 13 at a temperature of approx. 56° C. This tower is equipped with sieve trays. The formation of nitric acid is achieved in a flow counter-current to NO gas and process water which is fed to the top tray. In accordance with the equilibrium between $NO_2$ and $HNO_3$ the acid concentration decreases towards the top of the column as the $NO_2$ concentration diminishes. The generated reaction heat and part of the sensible heat are dissipated by the cooling water circulated in the cooling coils that are installed on the sieve trays. Depending on the concentration of the acid, the acid is withdrawn from the $1^{st}$, $2^{nd}$ or $3^{rd}$ sieve tray (counted from the bottom) of absorption tower 13.

The withdrawn crude acid is piped to $HNO_3$ degassing column 14, which is packed with Pall rings, and freed from physically dissolved nitrogen oxides in a flow counter-current to process air 25 (secondary air).

Part of the nitric acid leaving $HNO_3$ degassing column 14 is product-grade nitric acid, another part is used for scrubbing the secondary air in secondary air drier 22. The nitric acid thus diluted is either admixed to the condensate of gas cooler 9 or directly fed to a sieve tray in absorption tower 13, said sieve having a similar concentration.

The tail gas leaves the absorption unit at the head of absorption tower 13. It is then heated step by step from 25° C. to approx. 350° C., first in tail-gas pre-heater 19 in counter-current with secondary air and then in tail gas heater 8 in counter-current with NO gas. After the catalytic removal of nitric oxides in $NO_x$ reactor 21, it is expanded in tail-gas expansion turbine 15.

Figure 2:
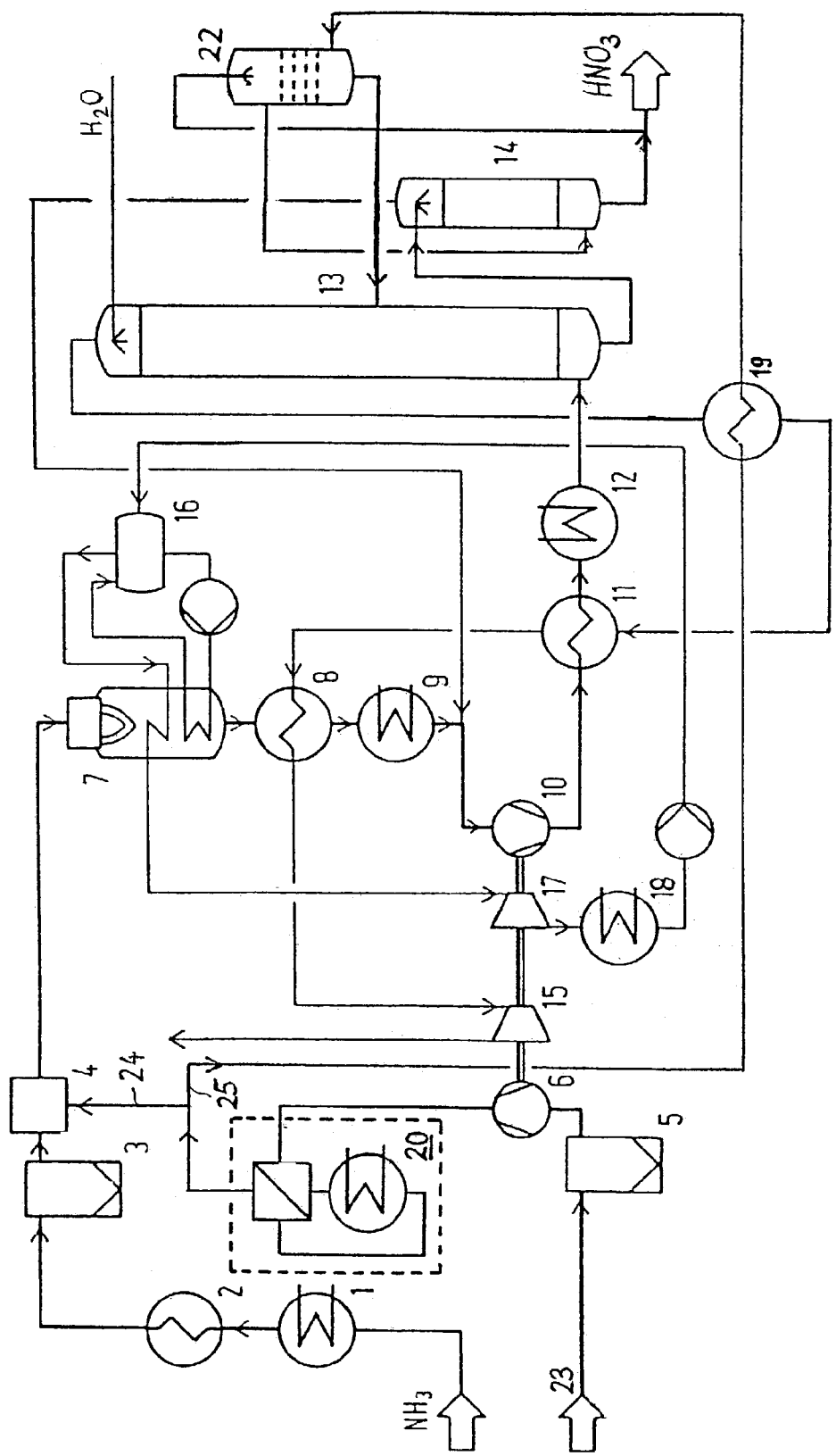
FIG. 2 depicts a dual-pressure process.

FIG. 2 depicts a dual-pressure process with $NH_3$ evaporator 1, $NH_3$ gas pre-heater 2, $NH_3$ gas filter 3, $NH_3$/air mixer 4, air filter 5, air compressor 6, invention-specific air drier 20, $NH_3$ burner 7 with La Mont waste heat boiler, tail gas heater 8, gas cooler 9, NO compressor 10, tail gas heater 11, gas cooler 12, absorption tower 13, $HNO_3$ degassing column 14, secondary air drier 22, tail-gas pre-heater 19, tail-gas expansion turbine 15, steam drum 16, steam condensation turbine 17 and condenser 18.

Liquid ammonia is supplied to $NH_3$ evaporator 1 at a pressure of approx. 11 bar abs. and a temperature of approx. 25° C. The evaporation in $NH_3$ evaporator 1 takes place at about 7.0 bar abs. which corresponds to an evaporation temperature of 14° C. Hot return cooling water is fed to $NH_3$ evaporator 1 so that the liquid ammonia evaporates almost completely at variable temperatures. The evaporation temperature rises as a function of the rising water content in the evaporator. The pressure of the evaporation system can be adjusted by varying the respective levels and cooling water flow rates.

The evaporated ammonia passes through a demister before it reaches steam-heated $NH_3$ gas pre-heater 2, in which it is heated to 80° C., and then to $NH_3$ gas filter 3 to remove all solid particles entrained, if any.

The compressor of the turbo set—consisting of air compressor 6, NO compressor 10, tail-gas expansion turbine 15 and steam condensation turbine 17—takes in through air filter 5 the moist atmospheric process air 23 laden with water vapour, which is required for the process, through air filter 5 and compresses it to 5.6 bar abs. at a temperature of approx. 254° C.

According to the present invention, this air stream is dried, withdrawing as much moisture in this example as required to attain a nitric acid concentration of 76%. The air drier 20 used in this example is provided with an integrated air/air heat exchanger which cools the air entering air drier 20 to approx. 20 to 40° C. Subsequently the pre-cooled air is cooled to approx. 1° C. by chilled water in an indirectly acting cooler integrated into air drier 20; the moisture entrained in the air precipitates on the cooling surfaces as a result of the air temperature that falls below the dew point so that the moisture is separated from the air. When the air leaves the cooler, the water load of the air is lower than that at the time when entering the system, i.e. the air has now been dried.

The dried air is passed to the heat-absorbing side of the air/air heat exchanger integrated into air drier 20 where the dried air is reheated to 220° C.

The dried and heated air stream that leaves air drier 20 is divided into two process-air streams (primary and secondary air) 24 and 25.

Process air 24 (primary air) and ammonia gas are supplied to $NH_3$/air mixer 4. The ammonia content in the gas mixture is kept constant at about 10.2% by vol. using a ratio controller. In the downstream $NH_3$ burner 7 the ammonia oxidises in the presence of a Pt—Rh catalyst at a temperature of 890° C. to form nitrogen oxide. The hot combustion gas flows through the LaMont waste heat boiler which forms a constructional unit with $NH_3$ burner 7 and through the tail gas heater 8 so that the reaction heat generated during oxidation to form NO and $NO_2$ is almost completely utilised for steam generation and as input energy (tail-gas expansion turbine 15).

Gas cooler 9 serves to cool the nitrogen oxide to approx. 50° C. by means of recycle cooling water, which results in the condensation of the major part of the reaction water from the combustion unit and in the formation of nitric acid with a concentration of approx. 44 to 50% by wt. An acid condensate pump (not shown in FIG. 2) sends the acid to a sieve tray in absorption tower 13, said tray having a similar acid concentration.

The cooled combustion gas from NO compressor 10 is then further compressed to 11 bar resulting in a temperature increase. The heated gas is cooled to 55° C. in tail gas heater 11 and gas cooler 12, causing the formation of further nitric acid which is also sent to a sieve tray in absorption tower 13, said tray having a similar concentration.

Process air 25 (secondary air) is cooled to approx. 60° C. to 80° C. in tail gas pre-heater 19, the heat being transferred to the tail gas from absorption tower 13. In $HNO_3$ degassing column 14, which is also referred to as bleaching column, process air 25 is used for degassing the crude acid, the air becoming laden with nitrous gas and then being admixed to the main gas stream upstream of the absorption unit. Prior to fulfilling this function in $HNO_3$ degassing column 14, said air is scrubbed with product-grade nitric acid and thus undergoes a secondary drying in invention-specific secondary air drier 22, which in this example is a $HNO_3$ scrubber.

The remaining NO gas enters absorption tower 13 at a temperature of approx. 56° C. This tower is equipped with sieve trays. The formation of nitric acid is achieved in a flow counter-current to NO gas and process water which is fed to the top tray. In accordance with the equilibrium between $NO_2$ and $HNO_3$ the acid concentration decreases towards the top of the column as the $NO_2$ concentration diminishes. The generated reaction heat and part of the sensible heat are dissipated by the cooling water circulated in cooling coils installed on the sieve trays. Depending on the concentration of the acid, the acid is withdrawn from the $1^{st}$, $2^{nd}$ or $3^{rd}$ sieve tray (counted from the bottom) of absorption tower 13.

The crude acid withdrawn is fed to $HNO_3$ degassing column 14, which is packed with Pall rings, and freed from physically dissolved nitrogen oxides in a flow counter-current to process air 25 (secondary air).

Part of the nitric acid leaving $HNO_3$ degassing column 14 is product-grade nitric acid, another part is used for scrubbing the secondary air in secondary air drier 22. The nitric acid thus diluted is either admixed to the condensate from gas cooler 9 or directly fed to a sieve tray in absorption tower 13, said sieve having a similar concentration.

The tail gas leaves the absorption unit and is then heated step by step from 25° C. to approx. 350° C., first in tail-gas pre-heater 19 in a flow counter-current to secondary air and then in tail gas heaters 8 and 11 in a flow counter-current to NO gas. Subsequently, it is expanded in tail-gas expansion turbine 15.

LEGEND

1 $NH_3$ evaporator
2 $NH_3$ gas pre-heater
3 $NH_3$ gas filter
4 $NH_3$/air mixer
5 Air filter
6 Air compressor
7 $NH_3$ burner
8 Tail gas heater
9 Gas cooler
10 NO compressor
11 Tail gas heater
12 Gas cooler
13 Absorption tower
14 $HNO_3$ degassing column
15 Tail-gas expansion turbine
16 Steam drum
17 Steam condensation turbine
18 Condenser
19 Tail-gas pre-heater
20 Air drier
21 $NO_x$ reactor
22 Secondary air drier
23 Process air
24 Process air (primary air)
25 Process air (secondary air)

The invention claimed is:

1. Process for the production of nitric acid of a concentration ranging from 67 to 76% by wt., using the mono-pressure or the dual-pressure process in which the ammonia feedstock is combusted with the aid of compressed process air and in which the nitrous gas formed during combustion is at least partly absorbed by water, thus forming nitric acid, wherein the water vapour content of the process air which is imported from outside the system is reduced by drying; wherein
   a portion of the process air is used for stripping the produced nitric acid to remove the dissolved $NO_2$ and NO, and this portion of the process air undergoes additional drying by scrubbing it with nitric acid.

2. Process according to claim 1, wherein the water separated in the drying section is used as process water.

3. Process according to claim 1, wherein the process air is dried by heat exchange with chilled water of a temperature between 1° C. and 20° C.

4. Process according to claim 1, wherein the process air is dried by way of heat exchange with coolant of a temperature of −25° C. to 5° C.

* * * * *